(12) United States Patent
Huang et al.

(10) Patent No.: US 7,002,725 B2
(45) Date of Patent: Feb. 21, 2006

(54) MICRO GRATING STRUCTURE

(75) Inventors: Long-Sun Huang, Taipei (TW);
Yao-Hui Kuo, Kaohsiung (TW)

(73) Assignee: Walshin Lihhwa Corporation,
Songshan District Taipei (TW)

( * ) Notice: Subject to any disclaimer, the term of this patent is extended or adjusted under 35 U.S.C. 154(b) by 0 days.

(21) Appl. No.: 10/810,022

(22) Filed: Mar. 25, 2004

(65) Prior Publication Data
US 2005/0036194 A1    Feb. 17, 2005

(30) Foreign Application Priority Data
Mar. 27, 2003   (TW) ............................... 92107004 A

(51) Int. Cl.
*G02B 26/00* (2006.01)
(52) U.S. Cl. ..................... 359/290; 359/291; 359/292; 359/298
(58) Field of Classification Search ................ 359/290, 359/291, 292, 298, 130, 297
See application file for complete search history.

(56) References Cited

U.S. PATENT DOCUMENTS 6,097,859 A * 8/2000 Solgaard et al. .............. 385/17
6,694,072 B1 * 2/2004 Neukermans et al. ......... 385/18

* cited by examiner

*Primary Examiner*—Georgia Epps
*Assistant Examiner*—Brandi Thomas
(74) *Attorney, Agent, or Firm*—Haverstock & Owens LLP

(57) ABSTRACT

The micro grating structure is provided. The micro grating structure includes a substrate; a first supporting structure and a second supporting structure; a first structure post and a second structure post, wherein the first structure post and the second structure post are mounted on the substrate between the first supporting structure and the second supporting structure; and a grating mounted between the first structure post and the second structure post and comprising a first, a second, a third and a fourth torsion beams, wherein the first and the second torsion beams are connected to the first and the second supporting structures respectively, the third and the fourth torsion beams are connected to the first and the second structure posts respectively, and the first, the second, the third and the fourth torsion beams are twisted by an electrostatic force so as to enable the grating to be inclined at an angle with respect to the substrate.

29 Claims, 11 Drawing Sheets

MICRO GRATING STRUCTURE

FIELD OF THE INVENTION

The present invention relates to a micro grating structure, and more particularly to a micro actuated blazed grating structure actuated by dual torsion beams.

BACKGROUND OF THE INVENTION (a) Digital Micromirror Device

Digital micromirror device (DMD) was developed by Texas Instruments that utilizes the micro electromechanical technology and semiconductor processes to integrate the micro-mechanical structures with CMOS circuits, in order to effectively control the actuating of a single micromirror by addressing by the transistors. The DMD is actuated by the static electricity. When the voltages actuate the DMD, the left and the right side of the mirrors will incline about 10 degrees, respectively. This property could be applied to projector displays and many other components relative to optical valves. The DMD is the representative device of the micro electromechanical system and is already a successful product for business now. From 1987 to this day, the product has been well developed to sixth generation design. From the first to the sixth generation, the structure of the mirrors is developed from the single-layer structure to the double-layer super structure. It not only increases the fill factor of the mirror arrangement, but also enlarges the area of the driving electrode. In the sixth generation, the spring structure even reduces the viscocity and the vibration of the mirrors and substantially improves the performance of the DMD.

The original purpose of the DMD is to be applied to projector displays. The digital light processing (DLP) is the first DMD-type projector display designed by Texas Instruments. The DMD in the DLP projects the light filtered by mirror reflection on the screen. Therefore, every pixel on the screen is composed of one DMD. That is to say, if a projector display has a resolution of XGA (1024×768), the amounts of the DMDs are approximately 800 thousand. The higher the resolution is, the more the DMDs are. Hence, improving the yield rate and reducing the costs are concerned by the industrial field.

Moreover, owing to the keen competition in the display market, the market domination rate of the DLP is hard to break through under the market dominations of the LCD and the plasma display. Therefore, some companies in the industrial field propose to apply the DMD to the optical communication device. Because of the properties of the small size of the mirror which is 16 µm ×16 µm, the space between the adjacent mirrors which is about only 1 µm, and the period of the valving which is 20 µs, the DMD is capable of applying to the optical communication device. If actuating some specific rows of the mirrors, the mirrors will look like blazed gratings from the side view. As shown in FIG. 1, which is a diagram showing the action of the DMD, the Fraunhofer diffraction of the incident light 12 is generated on the DMD 11 by actuating the DMD 11. Moreover, the actuating movement and angle could be controlled by the valves, and thus the DMD has the beam-splitted function of diffracting different wavelengths with different angles. Therefore, the DMD could be served as an optical add/drop multiplexer (OADM) and consequently the value thereof have been raised.

(b) Garting Light Valve

The concept of the grating light valve (GLV) is proposed by Stanford University and made by Silicon Light Machines™. The grating light valve is a grating controlled by valve which is designed according to the property of the light diffraction. As shown in FIG. 2, which is the side view showing the structure of the grating light valve, the grating light valve includes the ribbon structure 21, the common electrode 22, and the air gap 23. The grating light valve consisted of six ribbons 21. The width of each ribbon is about 3 µm, the length of each ribbon is about 100 µm, the thickness of each ribbon is about 125 nm, and the gap between the ribbon and the substrate (i.e. the air gap 23) is only about 650 nm. While the ribbon structure 21 is not actuated, the light travels by the reflection. After the common electrode 22 is actuated by electrifying, the ribbon structure 21 will bend to the air gap 23. As shown in FIG. 2, the grating looks like a square-well grating from the side view. In this way, the different wavelengths could be diffracted with different angles and then applied to the color splits of the display. With respect to controlling the first-order light, when the incident white light travels to the grating light valve, the ribbons will be drawn about λ/4 toward to the air gap 23 so as to adjust the diffraction of the first-order light. It is possible to decide the first-order diffraction angles of different wavelengths by controlling the width of the ribbon structure 21. Therefore, the principle of the actuation of the grating light valve can be applied to the display by this way, as shown in FIG. 3, which is a diagram showing the grating light valves applied to the display. When the incident light 31 is a white light, the first-order diffraction light, which respectively controls the red light 32, green light 33 and blue light 34, mixes the color with the same angle on the display. That is to say, the red pixel 35, the green pixel 36 and the blue pixel 37 can be gratings with different widths and depths according to the wavelengths in order to control the reflective light 38 consisted of the red light 32, the green light 33 and the blue light 34 reflecting to the screen 39 to form the angles and intensity of the different wavelengths. Owing to the displacement of the grating light valve is about λ/4, the displacement needs only 20 ns to carry out. With such a fast displacement, a single row of grating light valve made by scanning could be applied to the display. For example, XGA (1024×768) resolution needs only 768 sets of grating light valves to provide approximately 800 thousand pixels for 2-D display. In comparison with the DMDs, the costs are less and the design is simpler.

Besides, the grating light valve in controlling images could be divided into the digital mode and the analog mode. The digital mode means that the grating light valve is full opened (displaced about λ/4) and closed extremely fast so that the grey scale could be achieved by the ratio of the time of the opening to the time of the closing. The analog mode means that the depth of the displacement of the grating light valve is controlled. The grey scale could be achieved by modulating the intensity of the light between the displacement of 0 and λ/4 in accordance with that the displacement of λ/4 is defined as full opening. With regard to the efficiency of the light, the efficiency could reach 81% because the design is to collect ±1-order light.

(c) The Theory of the Blazed Grating

The luminous intensity of the diffraction light is generally concentrated on the zero-order diffraction. However, the luminous intensity could be concentrated on particular principal diffraction angle by different blazed gratings. FIG. 4 is a diagram illustrating the diffraction theory of the blazed grating, where $\theta_i$ is an incident angle, $\theta$ is any angle at which diffraction light 41 is diffracted, and $\theta_b$ is a blazed angle. It is possible to utilize the inclined plane of the grating 42 so as to acquire the largest luminous intensity on the angle $\theta_m$ which is the principal diffraction angle of the diffraction light 41 concentrated on the m-order diffraction. With respect to the normal N' of the inclined plane of the grating 42, the desired luminous intensity is similar to the diffraction light that is concentrated on the zero-order diffraction. In this way, assuming that $\theta=\theta_m$ firstly, the angle on which the diffraction light 41 is concentrated would be known while $\theta_m$ is acquired. As known from the geometrical optics, according to the normal N' of the inclined plane of the grating 42, the following equation could be calculated:

$$\theta_i - \theta_b = \theta_m + \theta_b, \qquad \text{equation (1)}$$

Besides, according to the diffraction theory, the following equation could be calculated:

$$m\lambda = a(\sin\theta_i + \sin\theta_m), \qquad \text{equation (2)}$$

where m denotes the order of the diffraction, $\lambda$ denotes the wavelength of the incident light 43, and a denotes the width of the single grating 42. The angle which the luminous intensity of the diffraction light is concentrated on the m-order diffraction could be obtained through equations (1) and (2). And the following equation could be calculated:

$$m\lambda = a[\sin\theta_i + \sin(2\theta_b - \theta_i)], \qquad \text{equation (3)}$$

which is the equation of the blazed grating.

Therefore, when designing the blazed grating, the principal diffraction angle on any desired order can be determined by the blazed angle, the incident angle and the width of the single grating so that the luminous intensity of the diffraction light could be concentrated on the specific principal diffraction angle.

Combining the advantages of the blazed grating, the property of the grating light valve, and the structure of the digital micromirror device, a prior blazed grating with valving function is developed, as shown in FIG. 5, which is a side view showing a micro grating structure with a single torsion beam according to the prior art. The micro grating structure includes the silicon substrate 51, the torsion beam 52 and the suspended grating mirror 53. When applying the voltages, the grating mirror 53 is twisted by the torsion beam 52 to be inclined an angle, and thus the diffraction occurs.

However, the grating mirror 53 of the prior blazed grating is actuated merely by the single torsion beam 52. Owing to the processes and the properties of the materials, it has disadvantages that:

(1) When the static electricity actuates a set of the grating mirrors 53, the synchronization of the torsion of the grating mirrors is not steady, which affects the efficiency of the light diffraction;

(2) When the static electricity vanishes, the efficiency of the light reflection is also bad after the return of a set of the grating mirrors 53 owing to the tiny inaccuracy when actuating.

Hence, it is known that a blazed grating having steady actuating and synchronizing is needed, so as to overcome the drawbacks of low efficiency of the light reflection and diffraction in the prior art.

SUMMARY OF THE INVENTION

It is an object of the present invention to provide a micro grating structure actuated by double torsion beams. The present invention not only improves the unsteady actuating and the bad synchronizing of the prior micro grating actuated by a single torsion beam, but also increases the efficiency of the light reflection and diffraction by actuating the grating mirrors uniformly.

In accordance with one aspect of the present invention, the micro grating structure includes a substrate; a first supporting structure and a second supporting structure; a first structure post and a second structure post, wherein the first structure post and the second structure post are mounted on the substrate between the first supporting structure and the second supporting structure; and a grating mounted between the first structure post and the second structure post and comprising a first, a second, a third and a fourth torsion beams, wherein the first and the second torsion beams are connected to the first and the second supporting structures respectively, the third and the fourth torsion beams are connected to the first, and the second structure posts respectively, and the first, the second, the third and the fourth torsion beams are twisted by an electrostatic force so as to enable the grating to be inclined at an angle with respect to the substrate.

Preferably, the substrate is a semiconductor substrate.

Preferably, the substrate is a silicon substrate.

Preferably, the first and the second supporting structures, the first and the second structure posts, the grating and the first, the second, the third and the fourth torsion beams are made of a low-stress silicon nitride.

Preferably, the first and the second supporting structures, the grating and the first, the second, the third and the fourth torsion beams further comprise an electric conductive and light reflective layer thereon.

Preferably, the electric conductive and light reflective layer is made of gold.

Preferably, the micro grating structure further includes an adhesion layer between the low-stress silicon nitride and the electric conductive and light reflective layer.

Preferably, the adhesion layer is made of a material selected from a group consisting of chromium, titanium and tungsten-titanium alloy.

Preferably, the electrostatic force is generated between the electric conductive and light reflective layer and the silicon substrate by an external power source supplied thereto.

Preferably, a light is diffracted on the electric conductive and light reflective layer of the grating when the grating is inclined.

Preferably, the light is reflected on the electric conductive and light reflective layer of the grating after the grating is returned to normal, which is resulting from a recuperative force of the first, the second, the third and the fourth torsion beams generated after the electrostatic force vanishes.

Preferably, a space is located among the first and the second supporting structures, the grating and the substrate.

Preferably, the first torsion beam has an identical deformation to that of the second torsion beam when the first and the second torsion beams are twisted.

Preferably, the third torsion beam has an identical deformation to that of the fourth torsion beam when the third and the fourth torsion beams are twisted.

Preferably, the angle is ranged between 0 and 1 degree.

In accordance with another aspect of the present invention, the micro grating structure includes a substrate; a first supporting structure and a second supporting structure; a plurality of pairs of structure posts, each pair of the structure posts comprise a first structure post and a second structure post, wherein the first structure post and the second structure post are mounted on the substrate between the first supporting structure and the second supporting structure; and a plurality of gratings mounted between the first structure post and the second structure post of each pair of the structure posts respectively and having an interval between each two adjacent ones, wherein each the grating further comprises a first, a second, a third and a fourth torsion beams, the first and the second torsion beams are connected to the first and the second supporting structure respectively, the third and the fourth torsion beams are connected to the first and the second structure posts respectively, and the first, the second, the third and the fourth torsion beams are twisted by an electrostatic force so as to enable the grating to be inclined at an angle with respect to the substrate.

Preferably, the substrate is a semiconductor substrate.

Preferably, the substrate is a silicon substrate.

Preferably, the interval is less than 2 μm.

Preferably, the first and the second supporting structures, the plurality of pairs of structure posts, the plurality of gratings and the first, the second, the third and the fourth torsion beams are made of a low-stress silicon nitride.

Preferably, the first and the second supporting structures, the plurality of gratings and the first, the second, the third and the fourth torsion beams further comprise an electric conductive and light reflective layer thereon.

Preferably, the electric conductive and light reflective layer is made of gold.

Preferably, the micro grating structure further includes an adhesion layer between the low-stress silicon nitride and the electric conductive and light reflective layer.

Preferably, the adhesion layer is made of a material selected from a group consisting of chromium, titanium and tungsten-titanium alloy.

Preferably, the electrostatic force is generated between the electric conductive and light reflective layer and the silicon substrate by an external power source supplied thereto.

Preferably, a light is diffracted on the electric conductive and light reflective layers of the plurality of gratings when the plurality of gratings are inclined.

Preferably, the light is reflected on the electric conductive and light reflective layer of each grating after the plurality of gratings are returned to normal, which is resulted from a recuperative force of the first, the second, the third and the fourth torsion beams generated after the electrostatic force vanishes.

Preferably, a space is located among the first and the second supporting structures, the plurality of gratings and the substrate.

Preferably, the first torsion beam has an identical deformation to that of the second torsion beam when the first and the second torsion beams of the plurality of gratings are twisted.

Preferably, the third torsion beam has an identical deformation to that of the fourth torsion beam when the third and the fourth torsion beams of the plurality of gratings are twisted.

Preferably, the angle is ranged between 0 and 1 degree.

The foregoing and other features and advantages of the present invention will be more clearly understood through the following descriptions with reference to the drawings, wherein:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
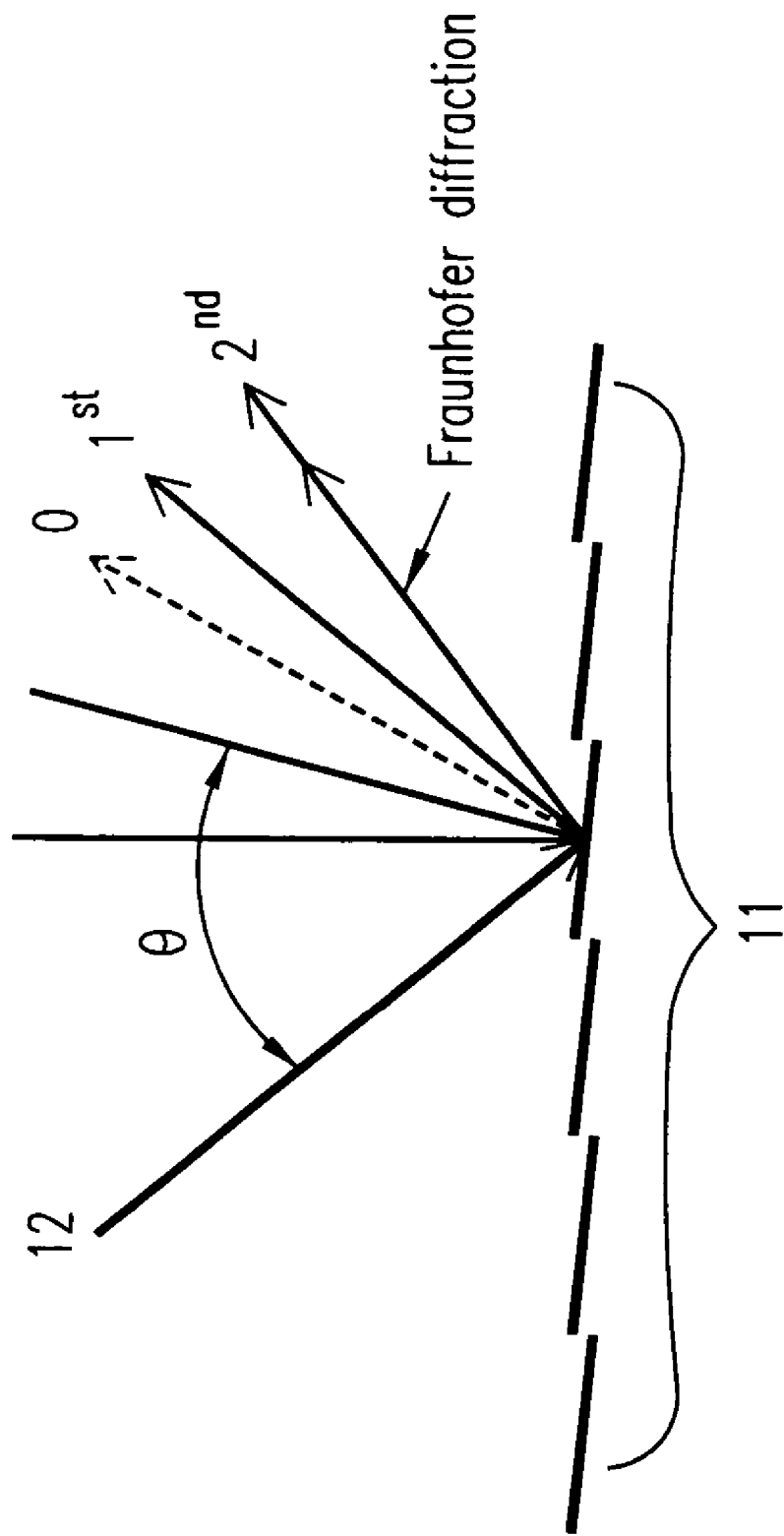
FIG. 1 is a diagram showing the action of the digital micromirror device according to the prior art.
Figure 2:
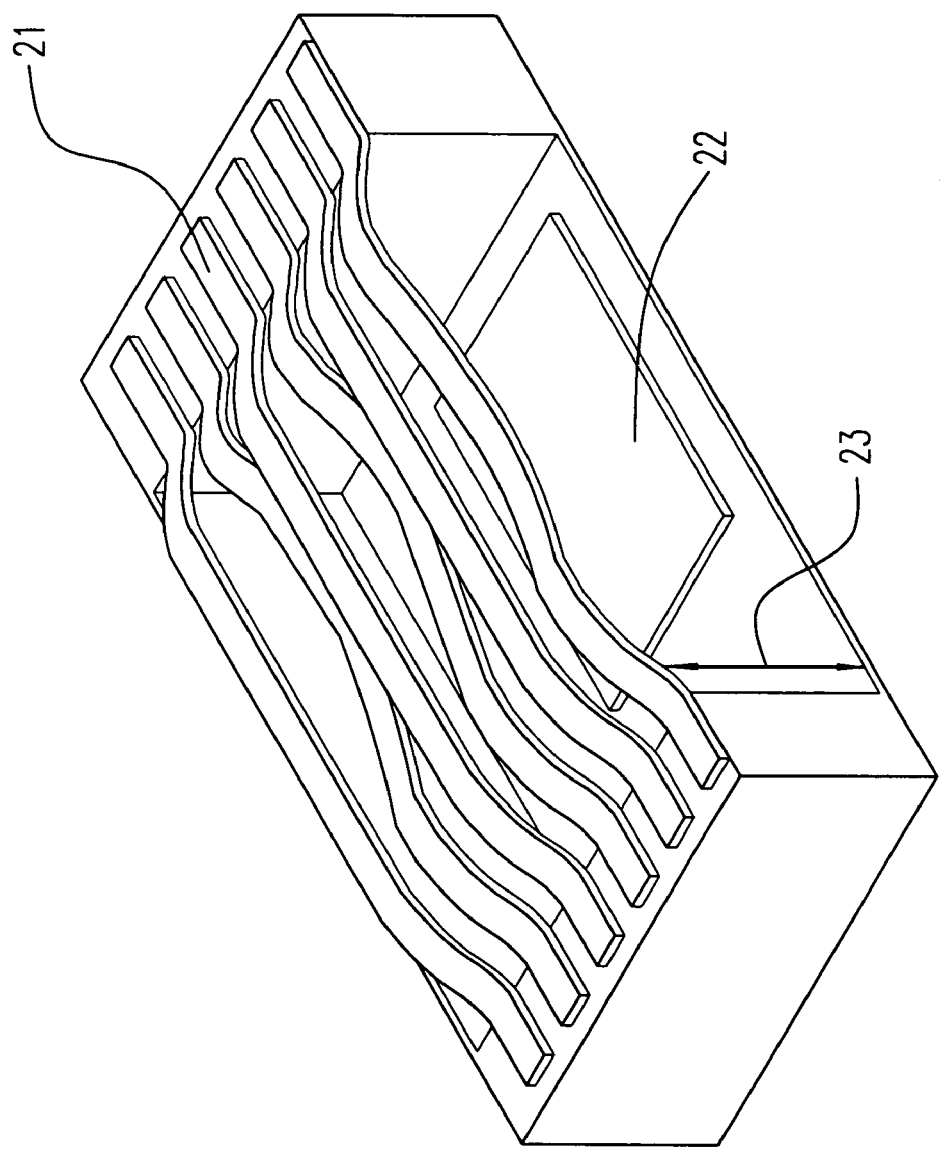
FIG. 2 is a side view showing the structure of the grating light valve according to the prior art.
Figure 3:
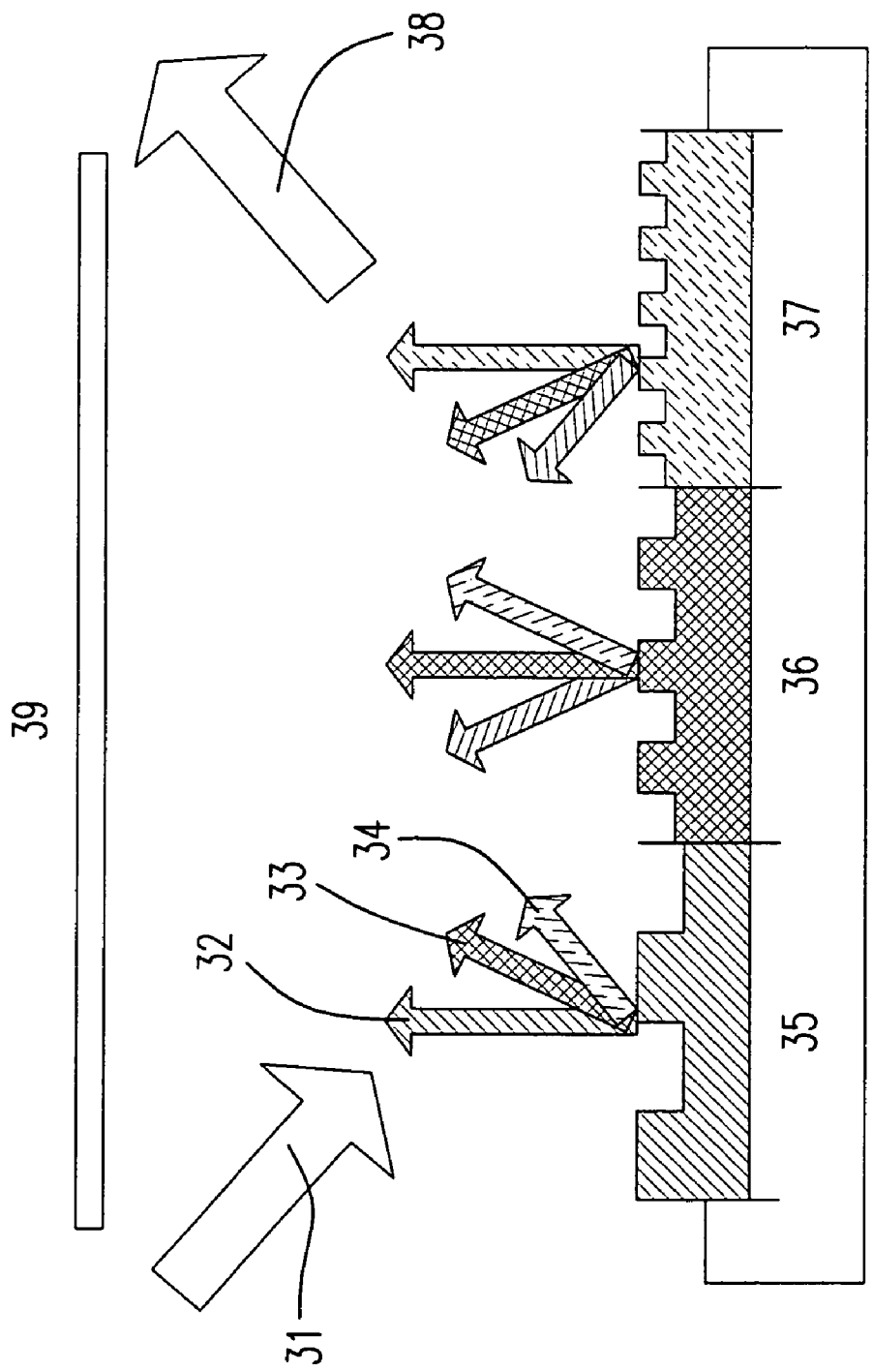
FIG. 3 is a diagram showing the grating light valves applied to the display according to the prior art.
Figure 4:
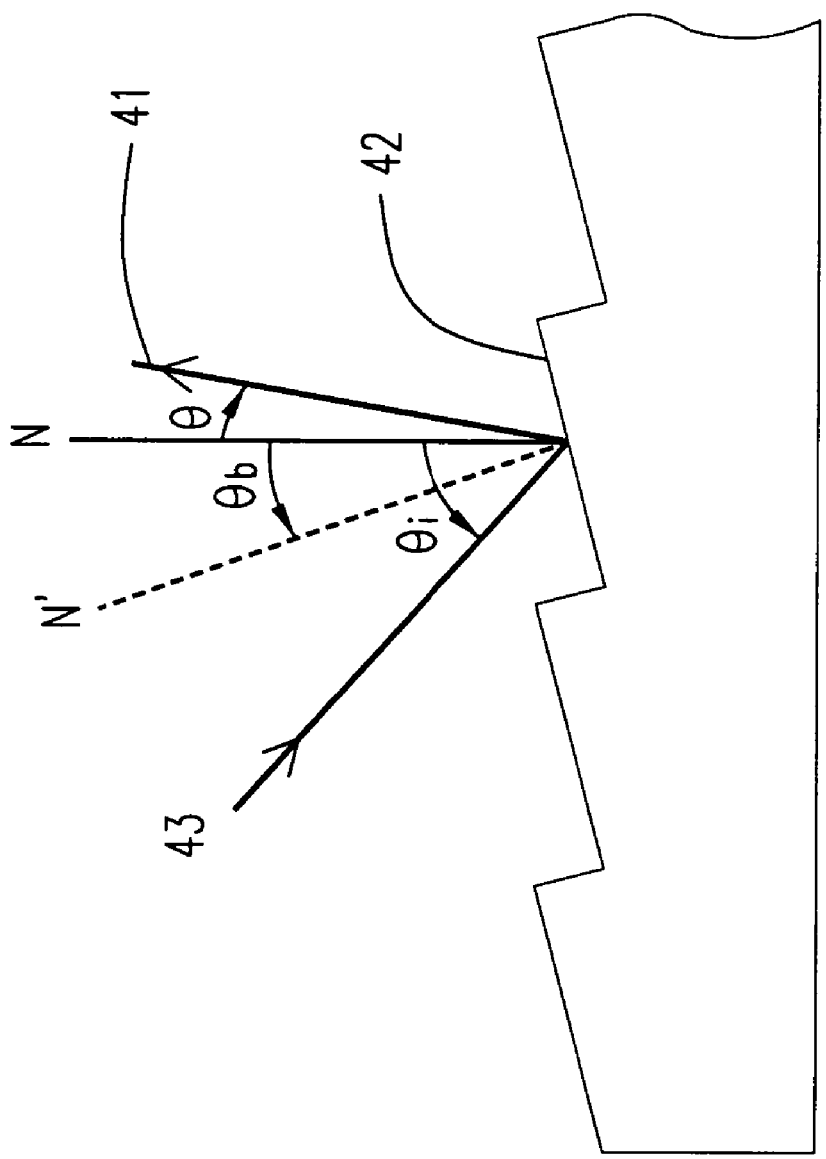
FIG. 4 is a diagram illustrating the diffraction theory of the blazed grating according to the prior art.
Figure 5:
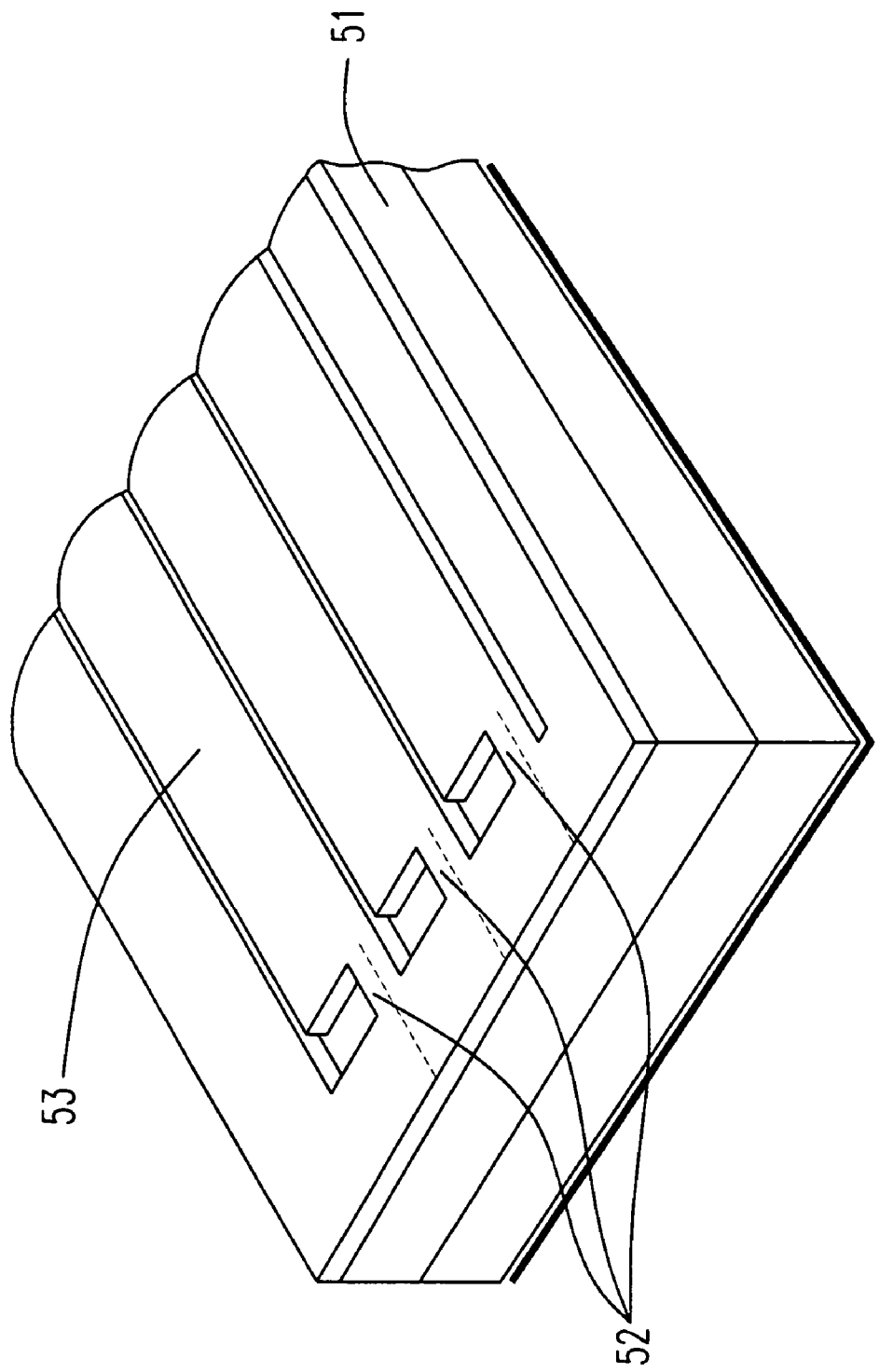
FIG. 5 is a side view of a micro grating structure with a single torsion beam according to the prior art.
Figure 6:
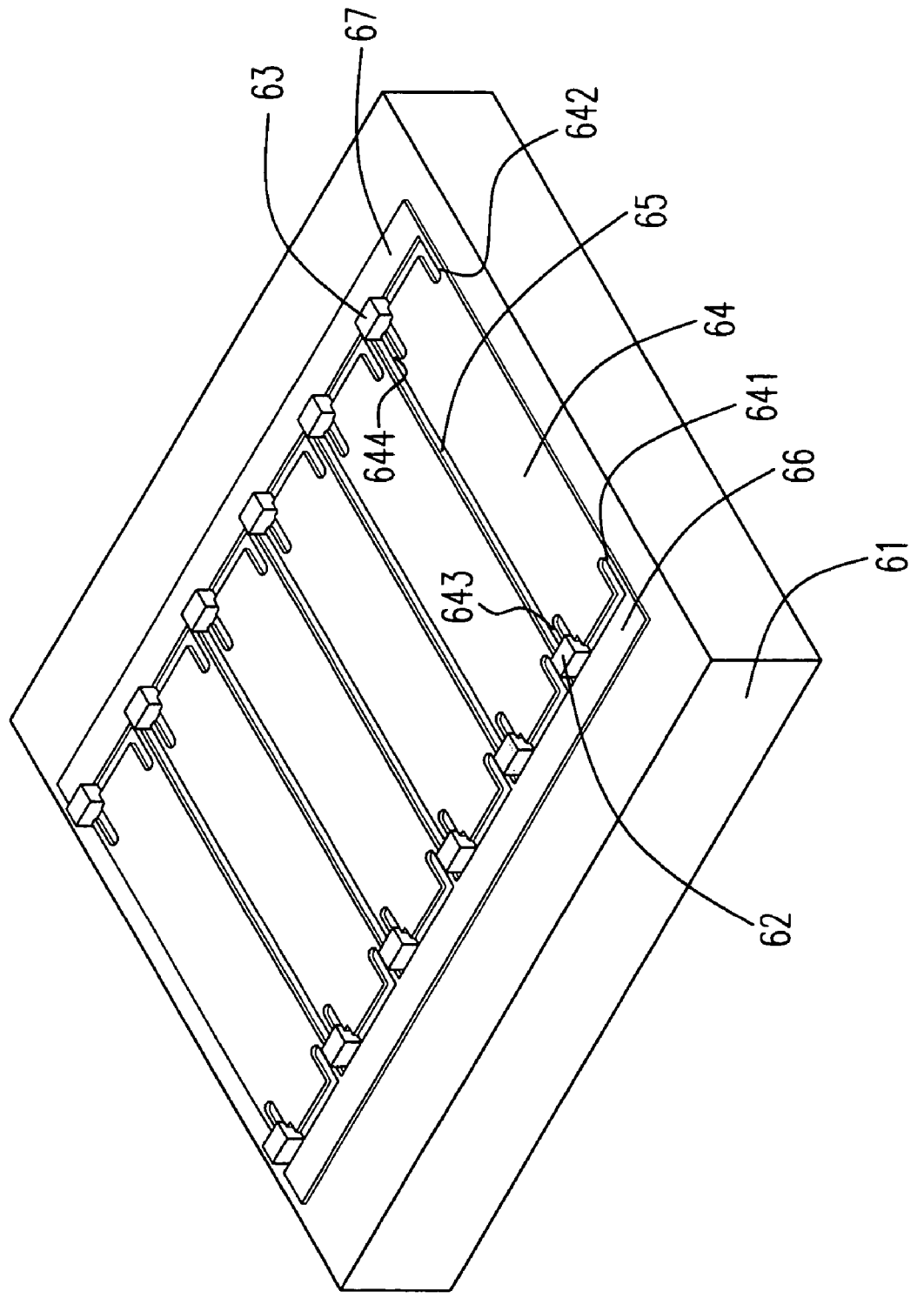
FIG. 6 is a top view of the micro grating structure according to a preferred embodiment of the present invention.

Please refer to FIG. 6, which is a top view of the micro grating structure according to a preferred embodiment of the present invention. The micro grating structure includes the semiconductor substrate 61, the plurality of pairs of structure posts, the plurality of gratings 64, the plurality of intervals 65, the first supporting structure 66 and the second supporting structure 67. Each pair of structure posts are made of the first structure post 62 and the second structure post 63. The grating 64 further includes the first torsion beam 641, the second torsion beam 642, the third torsion beam 643 and the fourth torsion beam 644. The semiconductor substrate 61 is made of silicon. The plurality of gratings 64 are mounted between the first structure post 62 and the second structure post 63. Each grating 64 is adjacent to each other with the interval 65 less than 2 μm. Each grating is connected to the first supporting structure 66 and the second supporting structure 67 by the first torsion beam 641 and the second torsion beam 642, respectively, and connected to the first structure post 62 and the second structure post 63 by the third torsion beam 643 and the fourth torsion beam 644, respectively.

Figure 7:
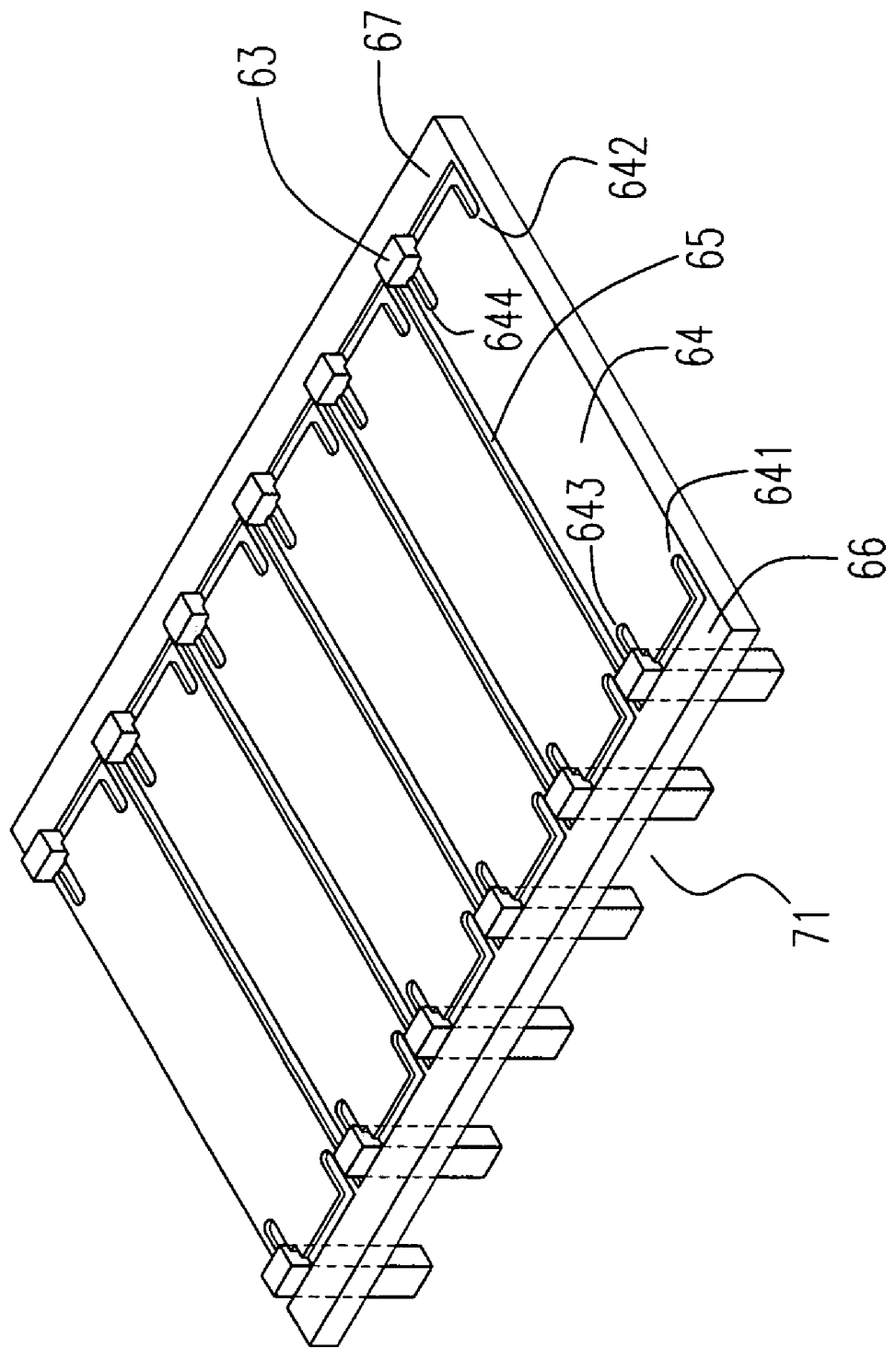
FIG. 7 is a diagram showing the substrate of the micro grating structure according to a preferred embodiment of the present invention.

Please refer to FIG. 7, which is a diagram showing the semiconductor substrate 61 according to FIG. 6. The first supporting structure 66, the second supporting structure 67 and the grating 64 are contacted with the substrate 61 only by the first structure post 62 and the second structure post 63 of each pair of the structure posts. Thus, the air gap 71 is between the first supporting structure 66, the second supporting structure 67, and the grating 64 and the substrate 61. Therefore, the first supporting structure 66, the second supporting structure 67, and the grating 64 are suspended-like on the substrate 61. Moreover, the first supporting structure 66, the second supporting structure 67, the grating 64, the first torsion beam 641, the second first torsion beam 642, the third first torsion beam 643 and the fourth first torsion beam 644 are all made of the low-stress silicon nitride. The chromium, the titanium or the tungsten-titanium alloy is evaporated or sputtered on the low-stress silicon nitride as an adhesion layer. Then the gold is evaporated or sputtered on the chromium layer to be served as the conductive layer and the reflective layer.

Figure 8A:
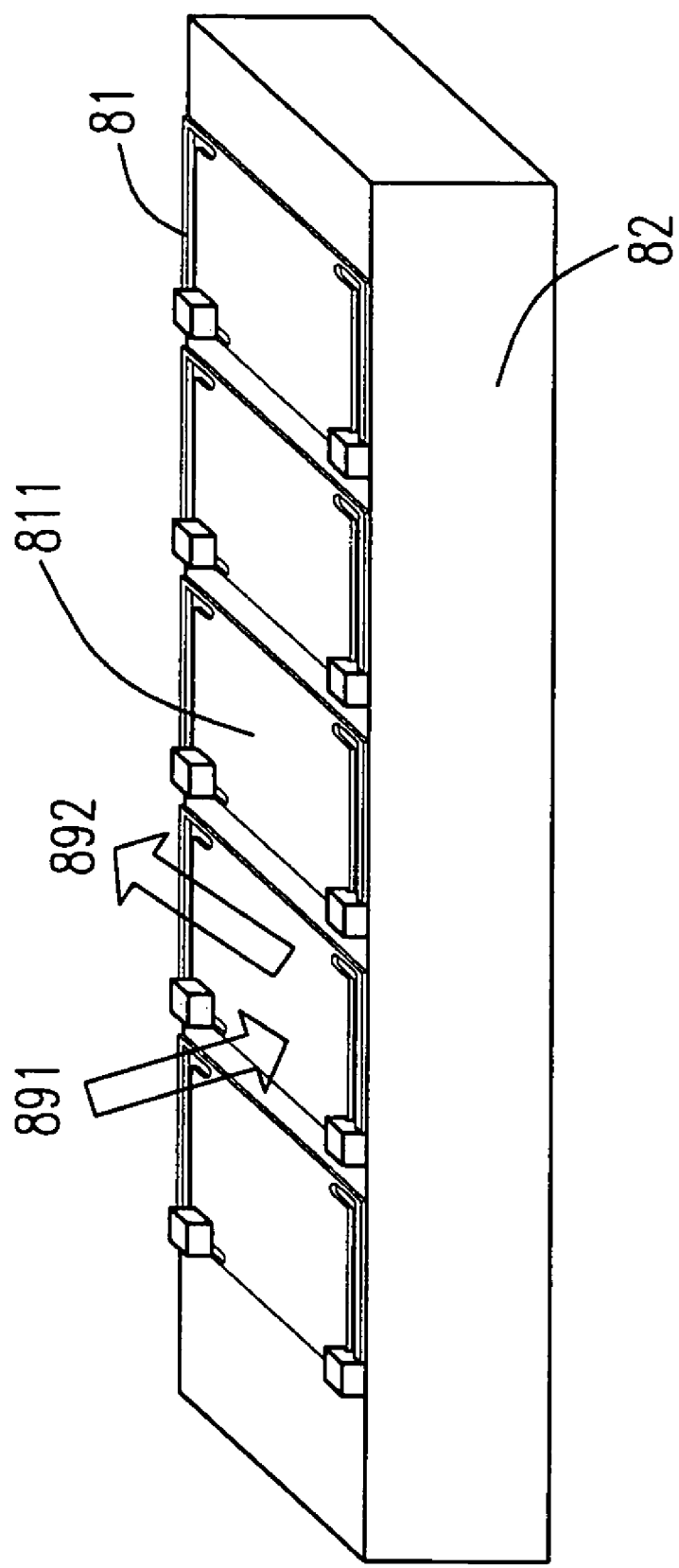
FIG. 8(a) is a diagram showing the light reflection of the micro grating structure before being actuated according to a preferred embodiment of the present invention.

Please refer to FIG. 8(a), which is a diagram showing the light reflection of the micro grating structure before being actuated according to a preferred embodiment of the present invention. When the micro grating structure is not actuated by the static electricity, the grating 81 is parallel to the substrate 82. Meanwhile, the reflection light 892 is generated from the incident light 891 by the electric conduction on the grating 81 and the reflection of the reflective layer 811.

Figure 8B:
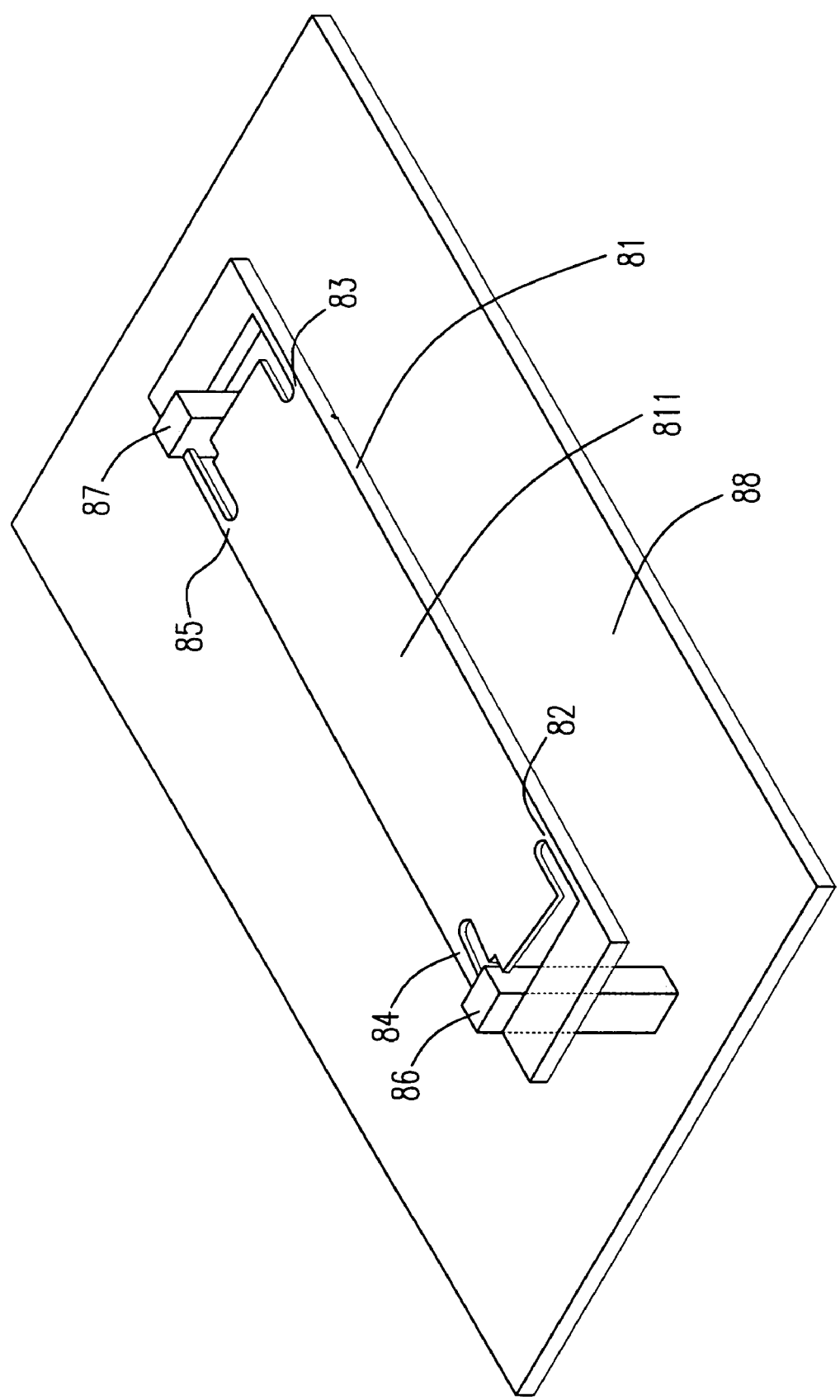
FIG. 8(b) is a top view of the single grating of the micro grating structure after being actuated according to a preferred embodiment of the present invention.
Figure 8C:
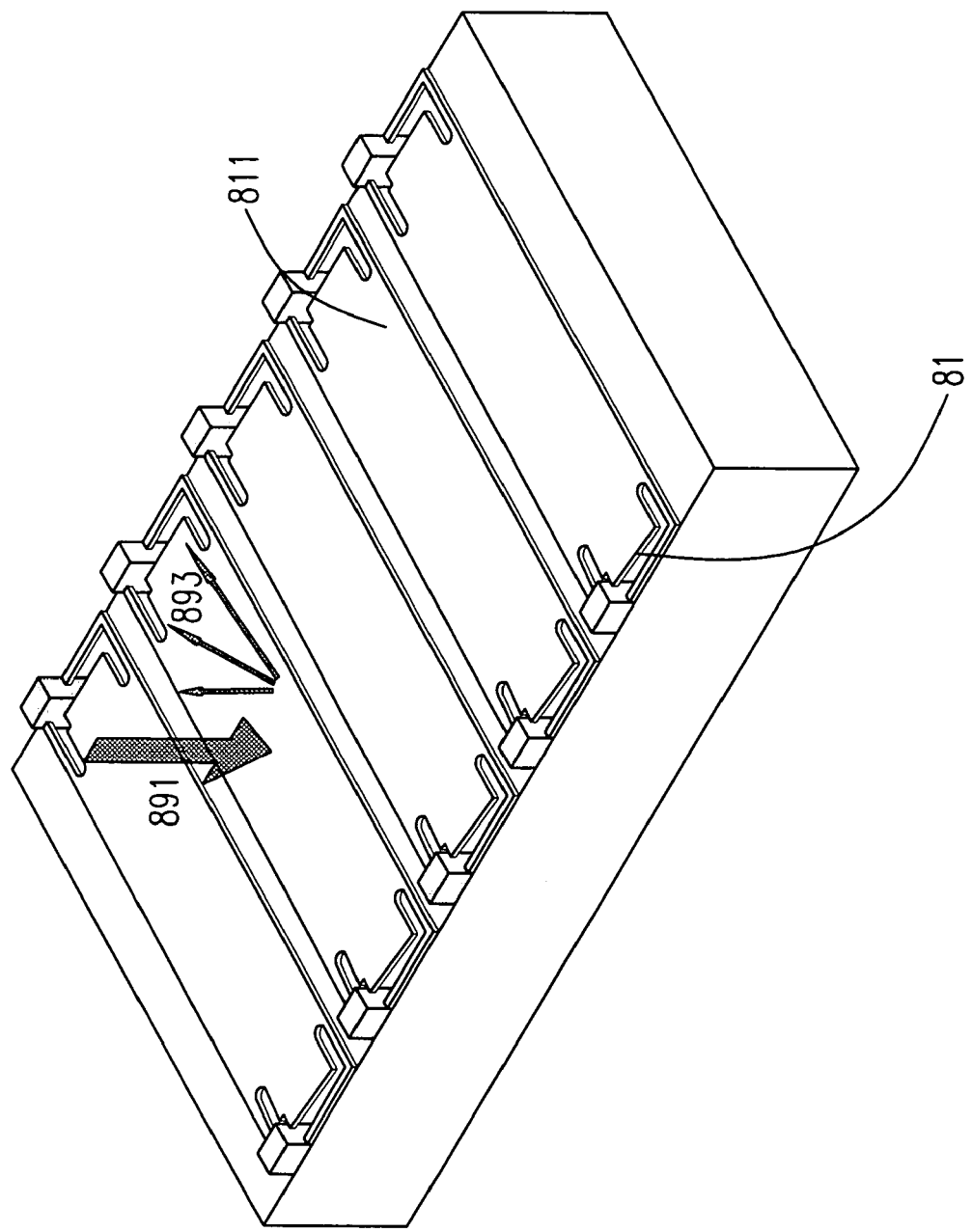
FIG. 8(c) is a diagram showing the light diffraction of the micro grating structure after being actuated according to a preferred embodiment of the present invention.

Please refer to FIGS. 8(b) and 8(c). FIG. 8(b) is an top view of the single grating of the micro grating structure after being actuated according to a preferred embodiment of the present invention and FIG. 8(c) is a diagram showing the light diffraction of the micro grating structure after being actuated according to a preferred embodiment of the present invention. FIG. 8(b) describes the actuating of one single grating only. The actuating of the plurality of the gratings are the same with that of single grating. The micro grating structure in FIG. 8(b) includes the grating 81, the fist torsion beam 82, the second torsion beam 83, the third torsion beam 84, the fourth torsion beam 85, the first structure post 86 and the second structure post 87. The grating 81 further includes the conductive and the reflective layer 811. When the conductive and the reflective layer 811 on the grating 81 of the micro grating structure is actuated by the static electricity, the fist torsion beam 82, the second torsion beam 83, the third torsion beam 84, the fourth torsion beam 85 are twisted with the same torsions, so that the grating 81 is inclined at an angle which is ranged between 0 and 1 degree with respect to the insulating substrate 88, and in which the first structure post 86 and the second structure post 87 are served as pivots. Therefore, the diffraction light 893 is generated by the diffraction of the incident light 891 through the conductive and the reflective layer 811 of the grating 81, as shown in FIG. 8(c).

Figure 9:
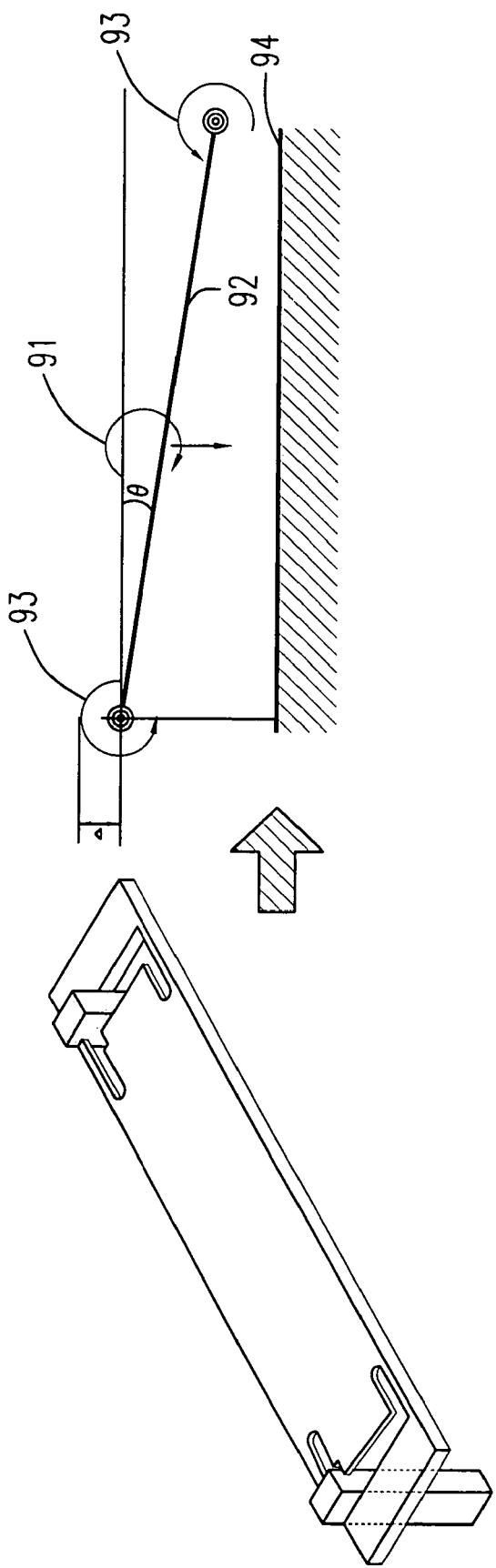
FIG. 9 is a diagram showing the torsion of the micro grating structure while being actuated according to a preferred embodiment of the present invention.

Please refer to FIG. 9, which is a diagram showing the torsion of the micro grating structure while being actuated according to a preferred embodiment of the present invention. When the torsion 91 generated by the static electricity vanishes, the grating 92 is returned to normal, that means the grating 92 is parallel to the substrate 94, by restoring torsion 93 generated by the torsion of the four torsion beams. At the same time, the reflection light is generated as described above.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claim is:

1. A micro grating structure, comprising:
   a substrate;
   a first supporting structure and a second supporting structure;
   a first structure post and a second structure post, wherein said first structure post and said second structure post are mounted on said substrate between said first supporting structure and said second supporting structure; and
   a grating mounted between said first structure post and said second structure post and comprising a first, a second, a third and a fourth torsion beams, wherein said first and said second torsion beams are connected to said first and said second supporting structures respectively, said third and said fourth torsion beams are connected to said first and said second structure posts respectively, and said first, said second, said third and said fourth torsion beams are twisted by an electrostatic force so as to enable said grating to be inclined at an angle with respect to said substrate, wherein a light is diffracted by said grating when said grating is inclined, and said light is reflected by said grating when said grating is returned to normal, which is resulting from a recuperative force of said first, said second, said third and said fourth torsion beams generated after said electrostatic force vanishes.

2. A micro grating structure according to claim 1 wherein said substrate is a semiconductor substrate.

3. A micro grating structure according to claim 2 wherein said substrate is a silicon substrate.

4. A micro grating structure according to claim 1 wherein said first and said second supporting structures, said first and said second structure posts, said grating and said first, said second, said third and said fourth torsion beams are made of a low-stress silicon nitride.

5. A micro grating structure according to claim 4 wherein said first and said second supporting structures, said grating and said first, said second, said third and said fourth torsion beams further comprise an electric conductive and light reflective layer thereon.

6. A micro grating structure according to claim 5 wherein said electric conductive and light reflective layer is made of gold.

7. A micro grating structure according to claim 5 further comprising an adhesion layer between said low-stress silicon nitride and said electric conductive and light reflective layer.

8. A micro grating structure according to claim 7 wherein said adhesion layer is made of a material selected from a group consisting of chromium, titanium and tungsten-titanium alloy.

9. A micro grating structure according to claim 7 wherein said electrostatic force is generated between said electric conductive and light reflective layer and said silicon substrate by an external power source supplied thereto.

10. A micro grating structure according to claim 9 wherein a light is diffracted on said electric conductive and light reflective layer of said grating when said grating is inclined.

11. A micro grating structure according to claim 1 wherein a space is located among said first and said second supporting structures, said grating and said substrate.

12. A micro grating structure according to claim 1 wherein said first torsion beam has an identical deformation to that of said second torsion beam when said first and said second torsion beams are twisted.

13. A micro grating structure according to claim 1 wherein said third torsion beam has an identical deformation to that of said fourth torsion beam when said third and said fourth torsion beams are twisted.

14. A micro grating structure according to claim 1 wherein said angle is ranged between 0 and 1 degree.

15. A micro grating structure, comprising:
   a substrate;

a first supporting structure and a second supporting structure;

a plurality of pairs of structure posts, each pair of said structure posts comprise a first structure post and a second structure post, wherein said first structure post and said second structure post are mounted on said substrate between said first supporting structure and said second supporting structure; and a plurality of gratings mounted between said first structure post and said second structure post of each pair of said structure posts respectively and having an interval between each two adjacent ones, wherein each said grating further comprises a first, a second, a third and a fourth torsion beams, said first and said second torsion beams are connected to said first and said second supporting structure respectively, said third and said fourth torsion beams are connected to said first and said second structure posts respectively, and said first, said second, said third and said fourth torsion beams are twisted by an electrostatic force so as to enable said grating to be inclined at an angle with respect to said substrate, wherein a light is diffracted by said plurality of gratings when said plurality of gratings are inclined, and said light is reflected by said plurality of gratings when said plurality of gratings are returned to normal, which is resulting from a recuperative force of said first, said second, said third and said fourth torsion beams generated after said electrostatic force vanishes.

16. A micro grating structure according to claim 15 wherein said substrate is a semiconductor substrate.

17. A micro grating structure according to claim 16 wherein said substrate is a silicon substrate.

18. A micro grating structure according to claim 15 wherein said interval is less than 2 $\mu$m.

19. A micro grating structure according to claim 15 wherein said first and said second supporting structures, said plurality of pairs of structure posts, said plurality of gratings and said first, said second, said third and said fourth torsion beams are made of a low-stress silicon nitride.

20. A micro grating structure according to claim 19 wherein said first and said second supporting structures, said plurality of gratings and said first, said second, said third and said fourth torsion beams further comprise an electric conductive and light reflective layer thereon.

21. A micro grating structure according to claim 20 wherein said electric conductive and light reflective layer is made of gold.

22. A micro grating structure according to claim 20 further comprising an adhesion layer between said low-stress silicon nitride and said electric conductive and light reflective layer.

23. A micro grating structure according to claim 22 wherein said adhesion layer is made of a material selected from a group consisting of chromium, titanium and tungsten-titanium alloy.

24. A micro grating structure according to claim 22 wherein said electrostatic force is generated between said electric conductive and light reflective layer and said silicon substrate by an external power source supplied thereto.

25. A micro grating structure according to claim 24 wherein a light is diffracted on said electric conductive and light reflective layers of said plurality of gratings when said plurality of gratings are inclined.

26. A micro grating structure according to claim 15 wherein a space is located among said first and said second supporting structures, said plurality of gratings and said substrate.

27. A micro grating structure according to claim 15 wherein said first torsion beam has an identical deformation to that of said second torsion beam when said first and said second torsion beams of said plurality of gratings are twisted.

28. A micro grating structure according to claim 15 wherein said third torsion beam has an identical deformation to that of said fourth torsion beam when said third and said fourth torsion beams of said plurality of gratings are twisted.

29. A micro grating structure according to claim 15 wherein said angle is ranged between 0 and 1 degree.

* * * * *